(12) United States Patent
Somasundaram et al.

(10) Patent No.: US 7,734,819 B1
(45) Date of Patent: Jun. 8, 2010

(54) APPARATUS AND METHODS FOR FORWARDING DATA BETWEEN PUBLIC NETWORKS VIA A PRIVATE NETWORK

(75) Inventors: Mahadev Somasundaram, Santa Clara, CA (US); Siva S. Jayasenan, Cupertino, CA (US); Mark A. Denny, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 226 days.

(21) Appl. No.: 11/775,832

(22) Filed: Jul. 10, 2007

Related U.S. Application Data

(63) Continuation of application No. 10/123,950, filed on Apr. 16, 2002, now Pat. No. 7,260,649.

(51) Int. Cl.
G06F 15/16 (2006.01)
(52) U.S. Cl. ...................................... 709/245; 709/249
(58) Field of Classification Search ................. 709/245, 709/249; 370/474; 710/3; 711/1
See application file for complete search history.

(56) References Cited

U.S. PATENT DOCUMENTS

| | | | |
|---|---|---|---|
| 5,848,242 | A | 12/1998 | Behaghel et al. |
| 5,856,974 | A | 1/1999 | Gervais et al. |
| 6,058,431 | A | 5/2000 | Srisuresh et al. |
| 6,243,754 | B1 | 6/2001 | Guerin et al. |
| 6,304,908 | B1 | 10/2001 | Kalajan |
| 6,480,508 | B1 | 11/2002 | Mwikalo et al. |
| 6,493,765 | B1 | 12/2002 | Cunningham et al. |
| 6,657,991 | B1 | 12/2003 | Akgun et al. |
| 7,246,166 | B1 * | 7/2007 | Watson ........................ 709/227 |
| 2001/0023459 | A1 | 9/2001 | Asami |
| 2002/0010799 | A1 | 1/2002 | Kubota et al. |
| 2002/0055971 | A1 | 5/2002 | Shahrier |
| 2002/0152325 | A1 | 10/2002 | Elgebaly et al. |

FOREIGN PATENT DOCUMENTS

WO  WO 0197485  12/2001

OTHER PUBLICATIONS

Hamzeh et al., Network Working Group, Rfc 2637, "Point-to-Point Tunneling Protocol (PPTP)", Copyright © The Internet Society (1999).
Townsley et al., Networking Group, RFC 2661, "Layer Two Tunnelling Protocol L2TP", Copyright © The Internet Society (1999).

* cited by examiner

*Primary Examiner*—Philip J Chea
(74) *Attorney, Agent, or Firm*—Weaver Austin Villeneuve & Sampson LLP

(57) ABSTRACT

Disclosed are methods and apparatus for handling data sent from a first public network to a second or same public network via a private network. In general terms, network translation address mechanisms are provided within the edge routers of the private network. When a first processing node sends a request to an edge router to access another processing node which resides in a public network, the edge router forms a binding based on two addresses associated with the first processing node. A first private address is initially associated with the first processing node, and the first processing node uses this private address to communicate with the private network. A second public address is also allocated to the first processing node based on the first processing node's request to communicate with a public node. The first processing node uses the allocated second public address to communicate with the requested public node.

20 Claims, 6 Drawing Sheets

APPARATUS AND METHODS FOR FORWARDING DATA BETWEEN PUBLIC NETWORKS VIA A PRIVATE NETWORK

CROSS REFERENCE TO RELATED PATENT APPLICATION

This application claims priority and is a continuation of U.S. patent application Ser. No. 10/123,950, filed 16 Apr. 2002 by Mahadev Somasundaram et al., which application is herein incorporated by reference in its entirety for all purposes.

BACKGROUND OF THE INVENTION

The present invention relates to methods and apparatus for processing data within a computer network. More specifically, this invention relates to mechanisms for forwarding data sent from a first processing node within a public network via a private network to a second processing node in a same of different public network.

FIG. 1 is a diagrammatic representation of a network having typical private wireless network which utilizes both a private interior address space and an exterior public address space. A first customer device 102a initially connects with the wireless network 104 (e.g., by logging onto wireless network), such as AT &T Wireless®. The first customer 102b may then wish to access a first type of service provider 108a on a public network, such as America On-line (AOL)®, via the initial connection to the private network 104. The customer device 102a is then assigned a public address from the same address space as the customer's chosen service provider. In the illustrated example, customer 102a obtains address 192.1.1.1 which is part of the address space 192.1.1.0/24 used by the public network that includes service provider 108a. Each customer device which accesses the wireless network may select from a number of public service providers. For instance, a second customer device 102b may wish to access a second type of service provider 108b. This customer device 102b is assigned address 172.1.1.1 since this customer's selected service provider 108b is within address space 172.1.1.0/24.

When a customer device wishes to then communicate with its selected service provider via the wireless network 104, the customer device uses the allocated public address (instead of its private address). The customer device 102b can only communicate with its selected service provider 208b through private wireless network 104. Unfortunately, the customer device's public address is not recognizable by the private network 104 since the private network uses private address space 10.1.1.1/24.

Two approaches are typically used to handle such traffic through the wireless network. The first approach is tunneling. When data reaches the wireless network, it is encapsulated with the customer device's private addresses which is then recognizable within the private network 104. Before the data leaves the wireless network, the data is decapsulated. This approach requires significant overhead for encapsulating and decapsulating the data, effectively reducing the usable bandwidth through the wireless network 104. A second approach is referred to as "route inject." In this approach, each router within the private wireless network populates routing tables based on traffic sent throughout the private wireless network. In other words, the routes learned by the edge routers (e.g., 103 or 106) for outside public nodes must be propagated to all of the routers which form part of private wireless network 104. Since private networks include an increasingly large number of internal routers, this approach may require significant overhead in the task of populating each router's routing tables.

Accordingly, there is a need for improved mechanisms for handling data sent from a public network to a same or other public network via a private network.

SUMMARY OF THE INVENTION

Accordingly, the present invention provides methods and apparatus for handling data sent from a first public network to a second or same public network via a private network. In general terms, network translation address mechanisms are provided within the edge routers of the private network. In other words, NAT enabled routers are provided for data that is transmitted from a public node, through the private network, to another public node. When a first processing node sends a request to an edge router (or other type of router) to access another processing node which resides in a public network, the edge router forms a binding (or causes a binding to be formed in an edge router if the router itself is not an edge router) based on two addresses associated with the first processing node. A first private address is initially associated with the first processing node, and the first processing node uses this private address to communicate with the private network (e.g. the first processing node sends a request to communicate with another public node). A second public address is also allocated to the first processing node based on the first processing node's request to communicate with a public node. The first processing node uses the allocated second public address to communicate with the requested public node. The edge router may also send the binding information to other edge routers through which data may be sent as the first processing node and its requested public node communicate. Upon receipt of the binding information, the other edge router(s) also form bindings between the private and public addresses of the first processing node.

The edge router(s) may then use these bindings to translate addresses within communication data sent between the first processing node and the requested public node. For example, data sent by the first processing node to the requested public node will be intercepted by an edge router before the data passes through the private network. The edge router will then translate intercepted data so that the public address associated with the first processing node is replaced with the private address associated with the first processing node. Likewise, data sent by the requested public node to the first processing node will be intercepted by an edge router before the data passes through the private network. The edge router will then translate the public address associated with the first processing node into the private address associated with the first processing node. When data then exits the private network (e.g., on its way to the first processing node or requested public node), an exit edge router then translates the private address associated with the first processing node into the public address associated with the first processing node based on a previously formed binding.

In one embodiment, a method of handling data sent from a first processing node within a public network, through a private network, to a second node within a same or different public network is disclosed. A request to communicate with the second processing node is received from the first processing node. The request is sent from the first processing node, through a first network address translation (NAT) enabled router, through the private network, to a second NAT enabled router. The request includes a private address associated with the first processing node and is received into the second NAT enabled router. A public address to be associated with the first processing node is obtained and sent to the first processing node. The obtained public address is based on an address space associated with the requested second processing node. A first binding is created between the public address and the private address associated with the first processing node. The first binding is sent to the first NAT enabled router.

In a further implementation, communication data sent from the first processing node to the second processing node is received. The communication data has a source address equal to the private address associated with the first processing node and is received into the second NAT enabled router. The source address of the communication data is translated from the private address into the public address associated with the first processing node. The translation is based on the first binding. The translated communication data is forwarded to the second processing node.

In one aspect, the public address associated with the first processing node is obtained by querying the second processing node. In another aspect, the public address associated with the first processing node is obtained by assigning a public address from a pool of public addresses associated with the second processing node. In one implementation, the private network is a wireless network, the second processing node is an internet service provider (ISP) server and the first processing node is a customer device for accessing the wireless network, through which the ISP server may be accessed. The wireless network allows access to a plurality of different ISP servers.

In another implementation, a second binding between the public address and the private address associated with the first processing node is formed at the second NAT enabled router. In a further aspect, the operations of obtaining a public address, creating a first binding, and sending the first binding to the first NAT enabled router are only performed when the second NAT enabled router is designated as an active router and the operations of receiving a first binding and forming a second binding are only performed when the first NAT enabled router is not designated as the active router.

In an alternative method embodiment for handling data sent from a first processing node within a public network, through a private network, to a second node within a same or different public network, a request to communicate with the second processing node is received from the first processing node. The request is sent from the first processing node, through a first network address translation (NAT) enabled router, through the private network, to a second NAT enabled router. The request includes a private address associated with the first processing node, and the request is received by the first NAT enable router. The request is forwarded to the private network, and a first binding between a public address allocated to the first processing node and the private address associated with the first processing node is received. The first binding is formed by the second NAT enabled router based on the request. A second binding is created based on the first binding.

In a further implementation, communication data sent from the first processing node to the second processing node is received. The communication data has a source address equal to the public address associated with the first processing node. The source address of the communication data is translated from the public address to the private address associated with the first processing node. The translation is based on the second binding. The translated communication data is forwarded to the private network. In one aspect, the operations of receiving a first binding and forming a second binding are only performed when the first NAT enabled router is not designated as the active router.

In another embodiment, the invention pertains to a network address translation (NAT) system operable to handle data sent from a first processing node within a public network, through a private network, to a second node within a same or different public network. The NAT system includes one or more processors and one or more memory. At least one of the memory and processors are adapted to provide at least some of the above described method operations. In yet a further embodiment, the invention pertains to a computer program product for handling data sent from a first processing node within a public network, through a private network, to a second node within a same or different public network. The computer program product has at least one computer readable medium and computer program instructions stored within at least one of the computer readable product configured to perform at least some of the above described method operations.

These and other features and advantages of the present invention will be presented in more detail in the following specification of the invention and the accompanying figures which illustrate by way of example the principles of the invention.

DETAILED DESCRIPTION OF SPECIFIC EMBODIMENTS

Figure 1:
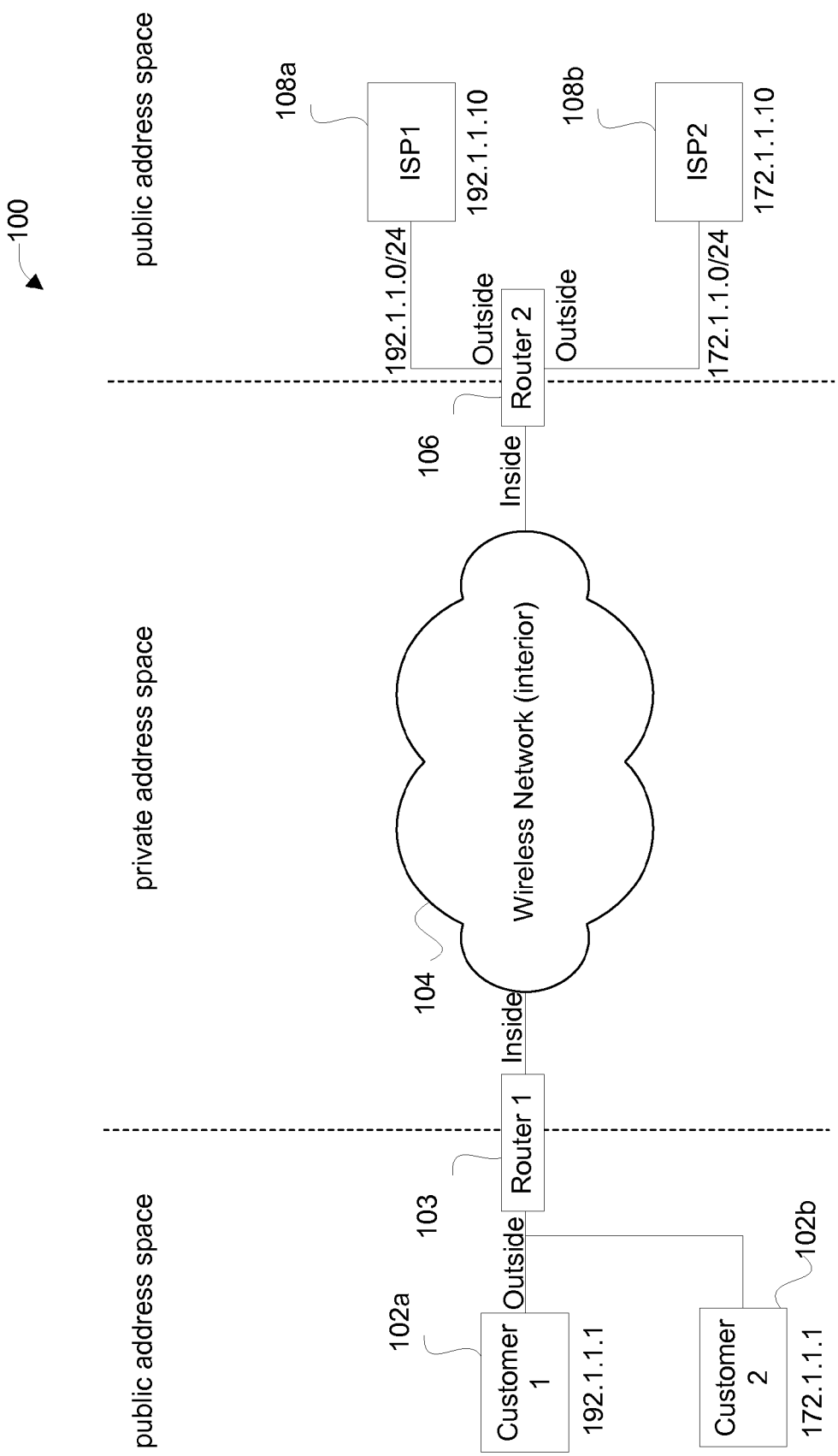
FIG. 1 is a diagrammatic representation of a network having typical private wireless network which utilizes both a private interior address space and an exterior public address space, e.g., by utilizing service providers within a public network.

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

In general terms, the present invention provides network address translation mechanisms for handling data sent from a first node in a public network, via a private network, to a second node in a same or different public network. The first node will initially use an associated private address to communicate with nodes or routers within the private network. During such communication, the first node may send a request to communicate with a second node within a public network. The request is sent to a request-handling router associated with the private network, such as an edge router. The request-handling router of the private node will also obtain a public address to be used by the first node to communicate with the requested public node. If the request-handling router is an edge router, the edge router will also remember the private and public addresses as being associated with the first node. The request-handling router also send this public and private address association information (e.g., in the form of a binding or NAT entry) to one or more edge routers of the private network. Thus, when data sent between the first node and the requested node is sent across the public-private boundary, each edge router may appropriately perform a network address translation (NAT) on the data (e.g., translate the private address associated with the first node into the public address associated with the first node, or visa versa) based on the retained public and private address association information.

Several typical operations that may be performed during a traditional NAT are omitted so as to not obscure the invention with unnecessary details which are well known to those skilled in the art. For instance, the present invention may include mechanisms for logging an error if a private address has no defined binding and there are no more available public addresses in the NAT device's pool for translation. Additionally, mechanisms may be included for handling TCP packets. Several typical procedures that may be performed on data along with translating the data and/or sending it to its destination are described further in U.S. Pat. No. 5,793,763 by Mayes et al., issued Aug. 11, 1998 and U.S. patent application Ser. No. 10/026,272 by Somasundaram, Mahadev et al, filed Dec. 21, 2001, which patent and application are incorporated herein in its entirety.

Figure 2:
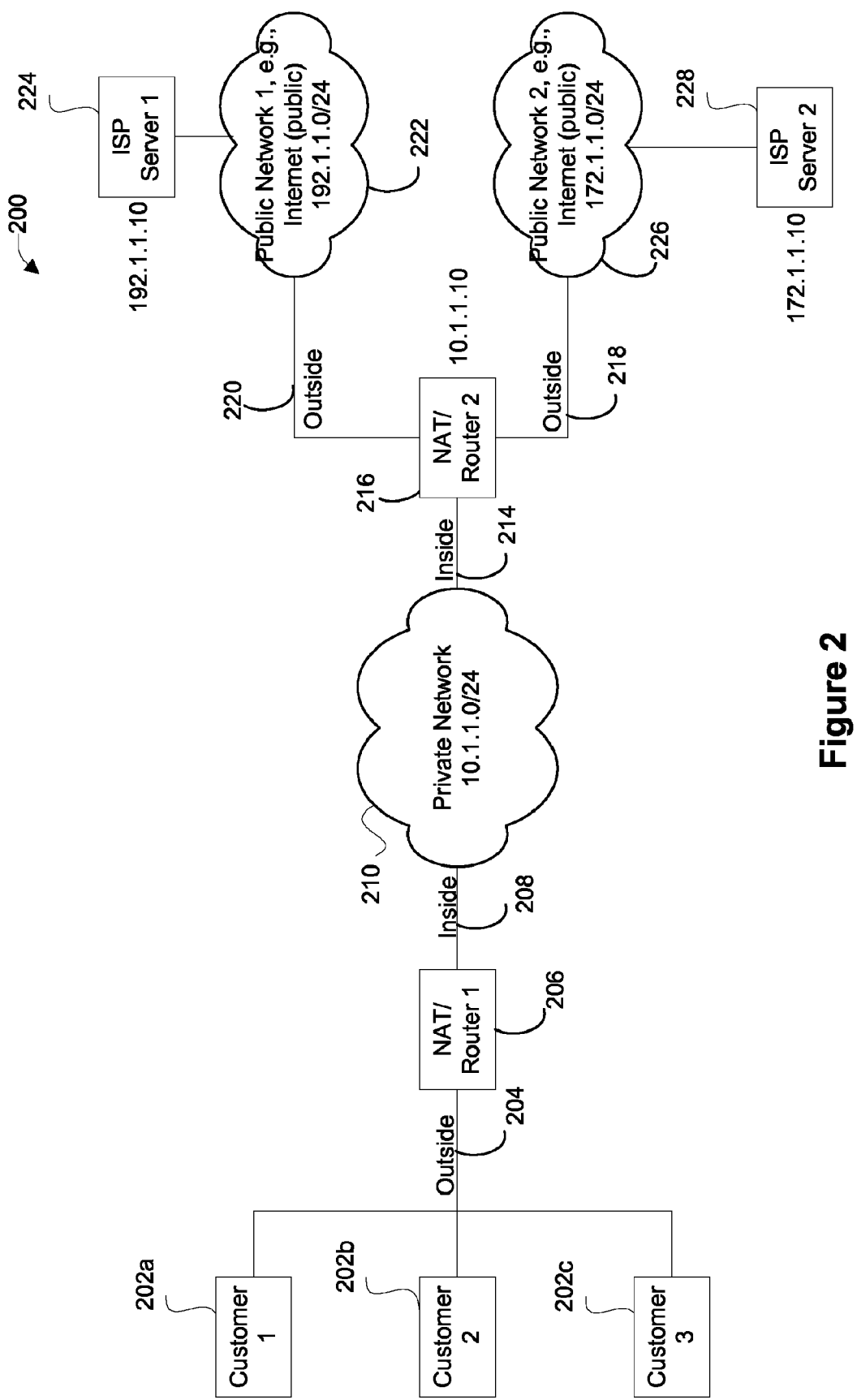
FIG. 2 is a diagrammatic representation of a network in which the mechanisms of the present invention may be implemented in accordance with one embodiment of the present invention.

FIG. 2 is a diagrammatic representation of a network 200 in which the mechanisms of the present invention may be implemented in accordance with one embodiment of the present invention. As shown, a private network 210, such as a wireless network, includes a first network address translation (NAT) enabled router device 206 and a second NAT enabled router device 216. The first and second NAT enabled routers 206 and 216 are edge routers that receive data originating from a public network before other routers or nodes of the private network 210 receive data. Likewise, the edge routers 206 and 216 are the last routers to handle data within the private network before the data is sent to a public network. The private network 210 may include any suitable number and type of edge routers.

In the illustrated embodiment, the first NAT device 206 is coupled to a plurality of customer devices 202. In one example implementation, the private network 210 is a wireless network, and each customer device 202 subscribes to the wireless network 210. Customer devices may include laptop computers, personal digital assistants (PDAs), cellular phones with web access, etc. Although referred to as "customer" devices, the devices 202 may be used for any suitable purpose by any suitable user, besides being used by a customer to access a subscription to a private network. Although the techniques of the present invention are described as being implemented within the context of a private wireless network, other types of private networks which provide access to one or more public networks for its users are also contemplated.

The second NAT device 216 is coupled to a first public network 222 and a second public network 226. Each public network may form part of any wide area network, such as the Internet. Any number and types of nodes may be coupled with each public network. In the illustrated embodiment, the first public network 222 includes an internet service provider (ISP) server 224, and the second public network 226 includes ISP server 228. Other types of nodes, besides ISP type servers, may be accessible by customer devices 202 through private network 210.

Figure 3:
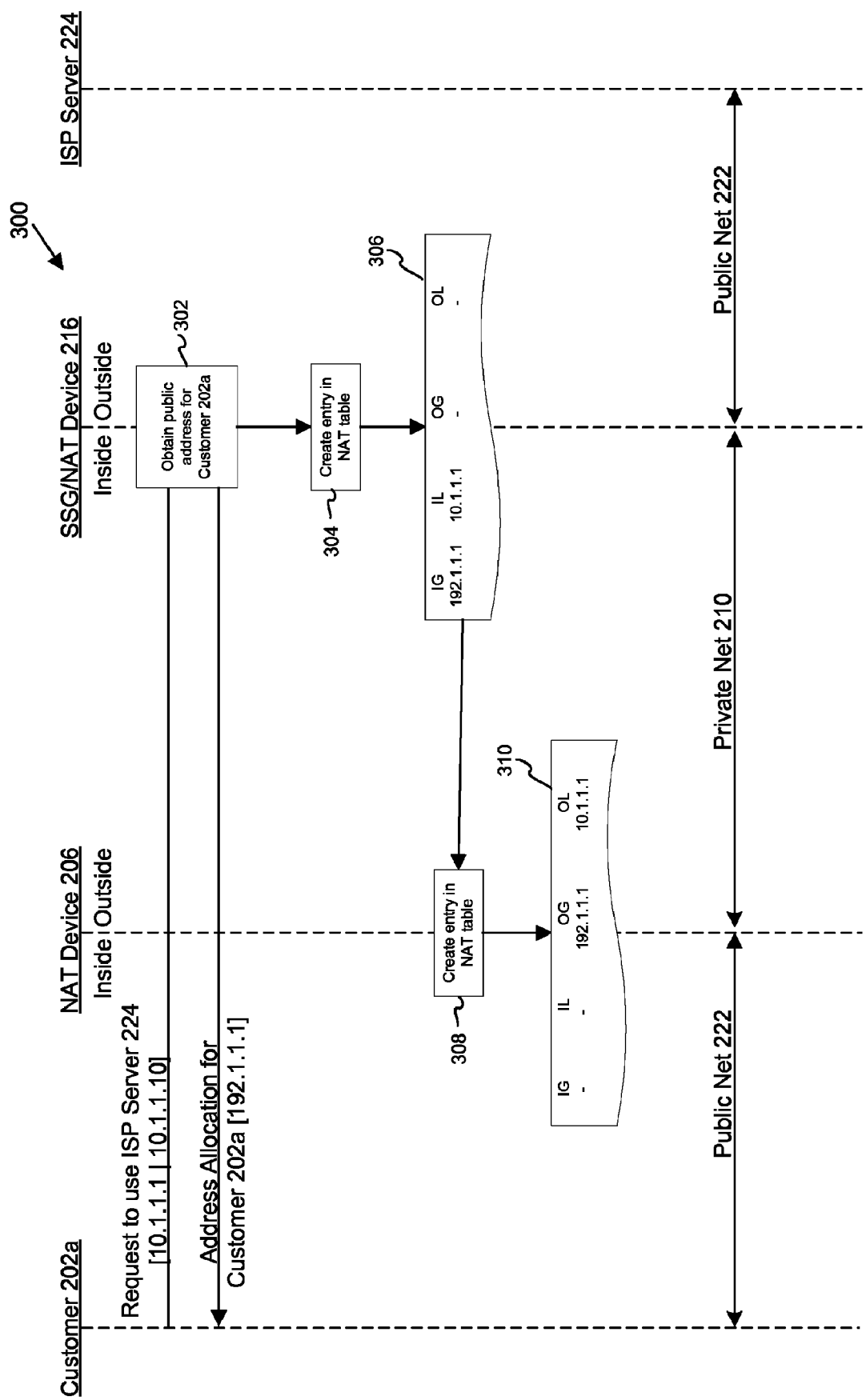
FIG. 3 is a communication diagram illustrating a procedure for handling a request sent from a customer to use ISP server in accordance with one embodiment of the present invention.

FIG. 3 is a communication diagram illustrating a procedure 300 for handling a request sent from a customer 202a to use ISP server 224 in accordance with one embodiment of the present invention. When customer device 202a initially logs onto or communicates with nodes within the private network 210, customer device 202a uses a private source address that is compatible with the private network 210. In the illustrated embodiment, the private network 210 uses private address space 10.1.1.0/24. Accordingly, customer 202a is configured with a source address equal to an address within the private address space, such as 10.1.1.1.

In one implementation, the customer device 202a is pre-configured to send requests to a particular request-handling node of the private network, and this request-handling node is pre-configured to handle requests from a customer device. In the illustrated embodiment, customer device 202a sends a request to use ISP server 224 to NAT device 216. Alternatively, the request may be sent to NAT device 206. The request may take any suitable form. One example of a request for a service provider is a data services command processor (DSCP) request. During this transaction, the NAT device 216 operates as a service selection gateway (SSG). For example, the NAT device 216 operates as a DSCP server. The NAT device 216 receives the request and then obtains an address allocation for customer device 202a based on the requested public node in operation 302. The address allocation may later be used by customer device 202a as its source address to communicate with ISP Server 224.

The address allocation operation 302 may be performed in any suitable manor. For example, the NAT device 216 may request an address for customer device 202a from ISP server 224. Alternatively, the NAT device 216 may assign an address to customer device 202a based on the address space associated with ISP server 224. After the address allocation is obtained, the NAT device 216 then sends the public address allocation to customer device 202a. The allocated public address is chosen to be compatible with the ISP server 224 which was requested by customer device 202a. In the illustrated embodiment, the public network 222 to which ISP server 224 uses address space 192.1.1.0/24. In this example, the address 192.1.1.1 is allocated to customer device 202a. In another example, if the customer device 202a had requested access to ISP Server 228, it would be assigned a public address within address space 172.1.1.1/24, such as 172.1.1.1, since ISP Server belongs to this same address space.

If the NAT device 216 is an edge router (as in the illustrated embodiment), the NAT device 216 also creates an entry in a NAT table in operation 304 based on the address allocation for customer 202a. As shown, the NAT entry 306 includes an inside global address 192.1.1.1 and an inside local address 10.1.1.1 for customer device 202a. NAT device 216 may send this NAT entry 306 to other edge router(s), such as NAT device 206. NAT device 206 then creates an entry in its own NAT table in operation 308 based on the sent NAT entry from NAT device 216. As shown, the new NAT entry 310 has an outside global address 192.1.1.1 and an outside local address 10.1.1.1. As a result of this address allocation to customer device 202a, customer device 202a and ISP server 224 now form part of public network 222, while NAT device 206 and NAT device 216 form part of private network 210.

A particular node of the private network may be pre-configured to handle requests from a customer device, create a corresponding NAT entry, and transmit such NAT entry information to other edge router(s) associated with the private network. Alternatively, the nodes of the private network may be configured to designate an "active" router for handling requests and maintaining and transmitting NAT state information to other non-active routers that will need this NAT information, i.e., edge routers which receive data sent between a public node and another public node via the private network. Another router may be designated as a "standby" router, which takes over these tasks of the active router when the active router is no longer able to perform such tasks. That is, a standby router may take over tasks for handling requests from a customer device and maintaining NAT state information regarding such customer device, as well as transmitting such information to other edge router(s).

An active and standby router may be designated by mechanisms similar to those used within the hot standby router protocol (HSRP) to designate "active" routers for forwarding data and maintaining states of all of the HSRP routers. However, in the present case, these designation mechanisms may be used to specify which router is responsible for handling requests from a first node to access a second public node and forming associated NAT entries based on such request (as opposed to specifying which router is responsible for routing). Several suitable mechanism for designating "active" and "standby" routers that may be easily applied to the present invention are described in U.S. patent application Ser. No. 09/735,199, entitled STATEFULL NETWORK ADDRESS TRANSLATION PROTOCOL IMPLEMENTED OVER A DATA NETWORK, by Mark Denny et al., which application is incorporated herein in its entirety.

The initial request handling node does not necessarily have to be an edge router. However, when the request handling node is not an edge router, it preferably transmits information that may be used to form NAT entries for a particular customer device to the relevant edge routers of the private network. For example, a non-edge router may obtain a public address allocation for a customer device requesting access to a public node. The request-handling non-edge router then transmits the private address and the public address associated with the requesting node to other edge router(s) that may each use this information to create an appropriate NAT binding for the customer device.

Figure 4:
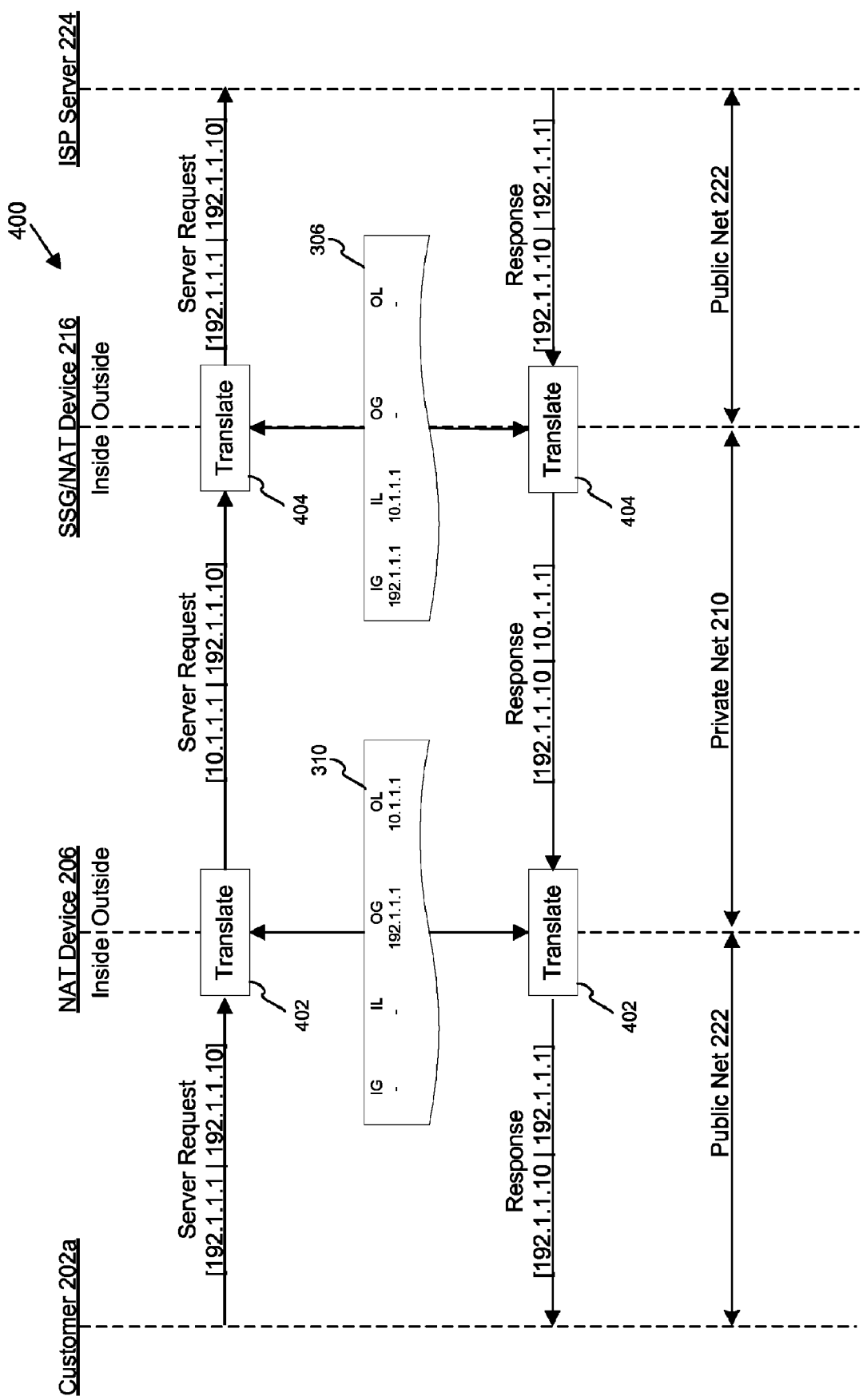
FIG. 4 is a communication diagram illustrating a procedure for handling communication data sent between customer and ISP server in accordance with one embodiment of the present invention.

After binding are set up in the appropriate edge router(s), each edge router is then capable of performing a NAT procedure on data sent between the customer device 202a and the requested public node 224. FIG. 4 is a communication diagram illustrating a procedure 400 for handling communication data sent between customer device 202a and ISP server 224 in accordance with one embodiment of the present invention. Initially, customer 202a sends a server request having source address 192.1.1.1 and destination address 192.1.1.10 to NAT device 206. For example, customer 202a may send a server request for a particular object, such as a web page, to ISP Server 224. NAT device 206 receives or intercepts the server request as it travels between the customer device 202a and the ISP Server 224.

NAT device 206 then translates the server request into a server request having private source address 10.1.1.1 and destination address 192.1.1.10. This translation is based on NAT entry 310. The translated request may then be transmitted through the private network 210. Since the translated request now incorporates the private address associated with customer device 202a, the nodes of the private network will now know which customer is associated with the translated request and be able to perform various management and monitoring tasks with respect to the translated request and the customer device 202a. For example, the translated request may be analyzed to determine billing rates or amounts for the customer device 202a. Likewise, other types of data (e.g., responses sent to the customer device 202a by ISP Server 224 in response to server requests by the customer 202a) transmitted between customer device 202a and ISP Server 224 may be monitored or managed.

After the translated server request passes through the private network 210, it is received by NAT device 216. When the NAT device 216 receives this translated server request, the translated server request is again translated in operation 404 into a server request having a public source address 192.1.1.1 and a destination address 192.1.1.10. This translation is based on the NAT device 216's NAT entry 306.

When the ISP server 224 sends a response having a source address 192.1.1.10 and a destination address 192.1.1.1, the NAT device 216 receives this response and translates it in operation 404. The NAT device 216 then sends the translated response with a private source address of 192.1.1.10 and a destination address of 10.1.1.1 through private network 210 to customer device 202a. When the NAT device receives this response, it again translates the response in operation 402 into a response having a public source address of 192.1.1.10 and a destination address of 192.1.1.1.

Figure 5:
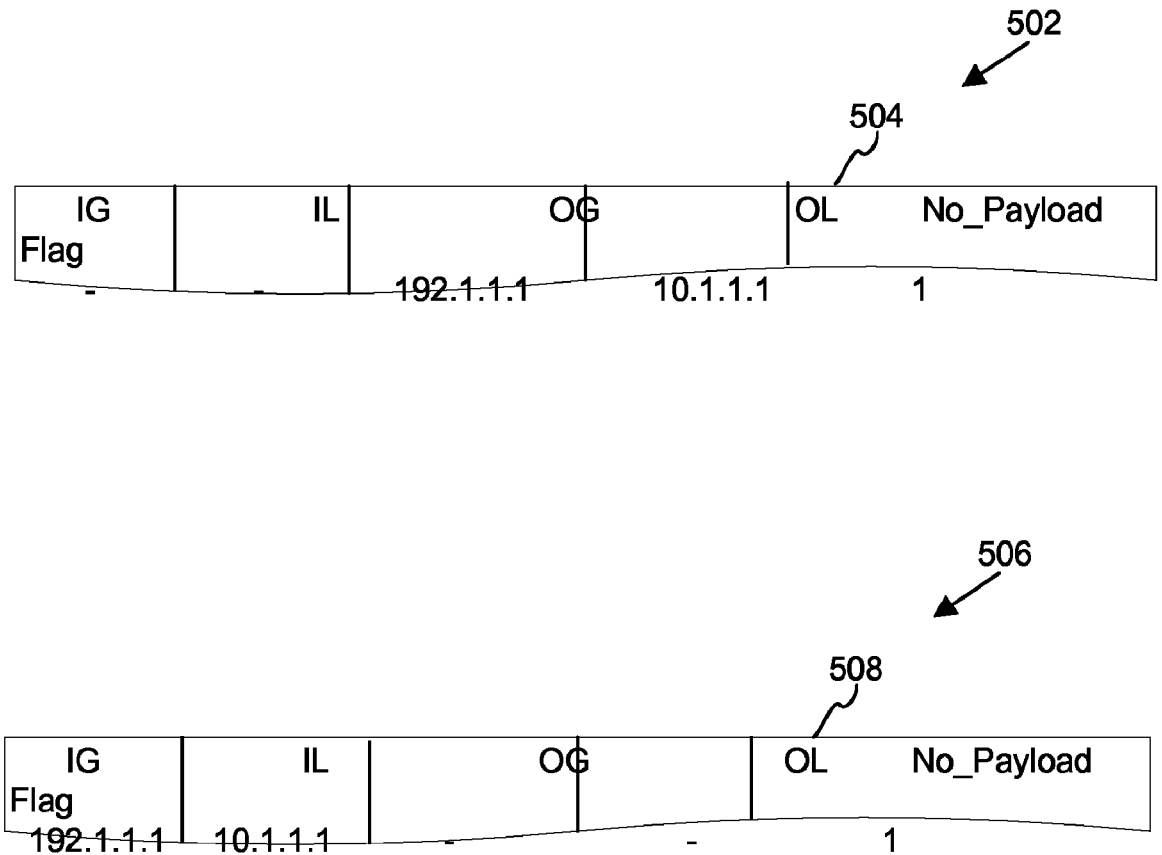
FIG. 5 illustrates a mechanism for preventing translation of the payload for data sent between a customer and a service provider through a private network in accordance with one embodiment of the present invention.
Figure 6:
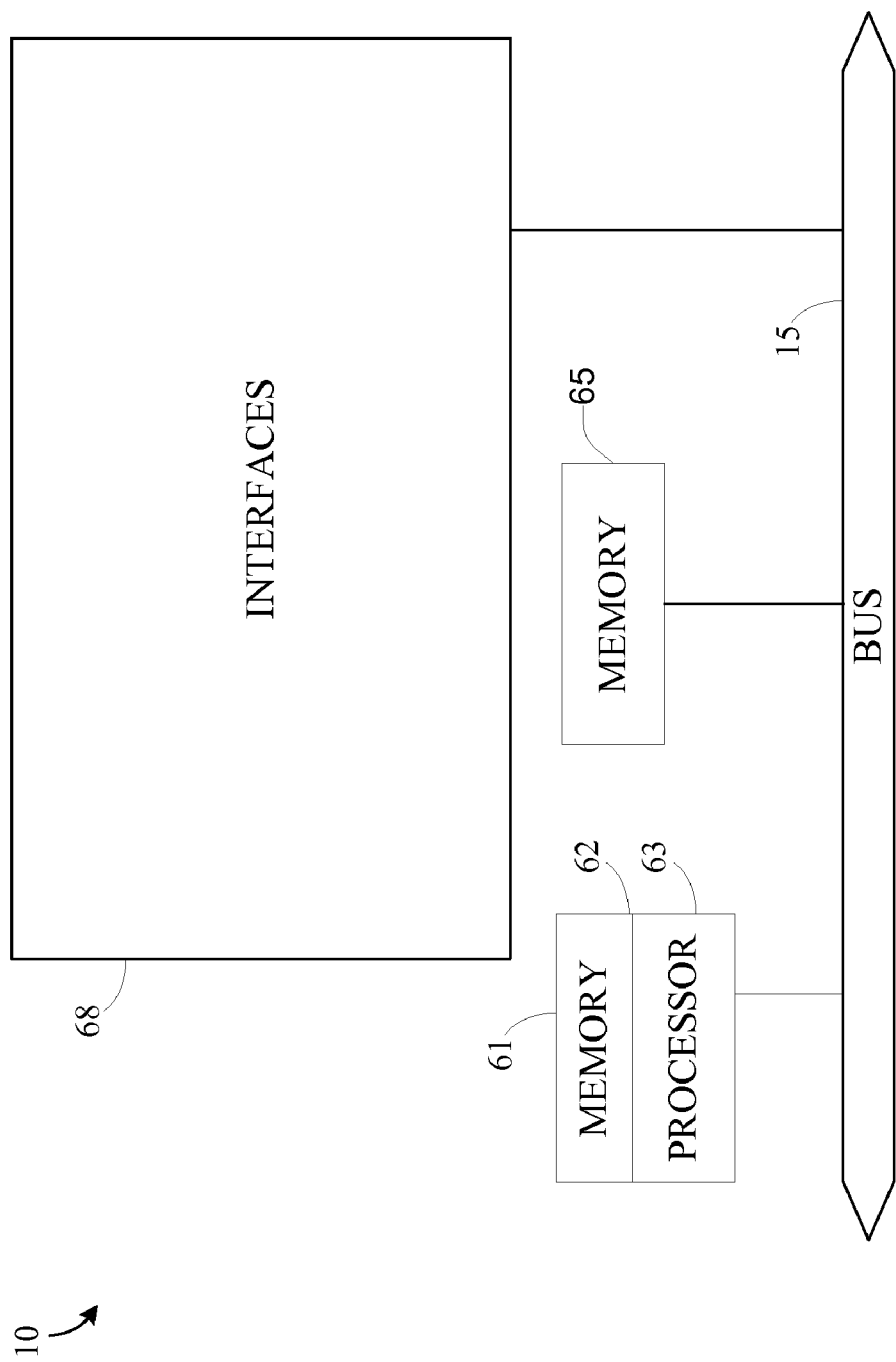
FIG. 6 is a diagrammatic representation of a network address translation (NAT) enabled router in which embodiments of the present invention may be implemented.

As described above, the NAT mechanisms of the present invention may include other procedures for facilitating the NAT process. FIG. 5 illustrates a mechanism for preventing translation of the payload for data sent between a customer and a service provider through a private network in accordance with one embodiment of the present invention. Typically, NAT enabled routers look at the payload of data to determine whether embedded addresses in the payload require translation. Translation of the payload is not necessary for the NAT mechanisms of the present invention. Accordingly, in the illustrated embodiment of FIG. 5, NAT entry 504 includes a no_payload flag. 504. Likewise NAT entry 506 includes a no_payload flag. 508. The no-payload flag may be added by the "active" NAT device 216 some time during handling of the request from the customer device 202a for accessing the public node 224. When the NAT device 216 then sends the NAT entry (with the no_payload flag) 502 to the other NAT device 206, NAT device 206 may create NAT entry 506 having a no_payload flag based on the received NAT entry 502. The no_payload flag may specify whether to translate the payload in any suitable manner. For example, the no_payload flag may be set to "1" to indicate no translation of the payload should occur and set to "0" to indicate translation of the payload may occur.

The NAT devices 216 and 206 may then use their respective NAT entries 502 and 506 to translate data sent between customer device 202a and ISP Server 224. NAT entry 502 may be used by NAT device 206, while NAT entry 506 may be used by NAT device 216, to translate data sent between customer 202a and ISP server 224 in the previous example described with respect to FIG. 4. When each NAT device encounters data sent from customer 202a and ISP server 224, it merely translates header information and does not peak into the payload to translate addresses therein if the no_payload flag indicates that the payload should not be translated (e.g., by being set to "1").

Generally, the techniques for performing network address translation may be implemented on software and/or hardware. For example, they can be implemented in an operating system kernel, in a separate user process, in a library package bound into network applications, on a specially constructed machine, or on a network interface card. In a specific embodiment of this invention, the techniques of the present invention are implemented in software such as an operating system or in an application running on an operating system.

A software or software/hardware hybrid packet processing system of this invention is preferably implemented on a general-purpose programmable machine selectively activated or reconfigured by a computer program stored in memory. Such programmable machine may be a network device designed to handle network traffic. Such network devices typically have multiple network interfaces including frame relay and ISDN interfaces, for example. Specific examples of such network devices include routers and switches. For instance, the packet processing systems of this invention may be specially configured routers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, the techniques of the present invention may be implemented on a general-purpose network host machine such as a personal computer or workstation. Further, the invention may be at least partially implemented on a card (e.g., an interface card) for a network device or a general-purpose computing device.

Referring now to FIG. 5, a network address translation (NAT) enabled router 10 suitable for implementing embodiments of the present invention includes a master central processing unit (CPU) 62, interfaces 68, and a bus 15 (e.g., a PCI bus). When acting under the control of appropriate software or firmware, the CPU 62 is responsible for such router tasks as routing table computations and network management. It may also be responsible for handling request from a first node to access a public node through a private network, creating NAT bindings or entries, transmitting NAT binding or NAT entry information to other NAT enabled routers, performing NAT operations, etc. It preferably accomplishes all these functions under the control of software including an operating system (e.g., the Internetwork Operating System (IOS®) of Cisco Systems, Inc.) and any appropriate applications software. CPU 62 may include one or more processors 63 such as a processor from the Motorola family of microprocessors or the MIPS family of microprocessors. In an alternative embodiment, processor 63 is specially designed hardware for controlling the operations of router 10. In a specific embodiment, a memory 61 (such as non-volatile RAM and/or ROM) also forms part of CPU 62. However, there are many different ways in which memory could be coupled to the system. Memory block 61 may be used for a variety of purposes such as, for example, caching and/or storing data, programming instructions, etc.

The interfaces 68 are typically provided as interface cards (sometimes referred to as "line cards"). Generally, they control the sending and receiving of data packets or data segments over the network and sometimes support other peripherals used with the router 10. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 62 to efficiently perform routing computations, network diagnostics, security functions, etc.

Although the system shown in FIG. 5 is one specific router of the present invention, it is by no means the only router architecture on which the present invention can be implemented. For example, an architecture having a single processor that handles communications as well as routing computations, etc. is often used. Further, other types of interfaces and media could also be used with the router.

Regardless of network device's configuration, it may employ one or more memories or memory modules (such as, for example, memory block 65) configured to store data, program instructions for the general-purpose network operations and/or the inventive techniques described herein. The program instructions may control the operation of an operating system and/or one or more applications, for example. The memory or memories may also be configured to store received packets, identifiers to track each flow and the number of such flows, one or more NAT Tables, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

What is claimed is:

1. A method of handling data sent from a first processing node within a public network, through a private network, to a second node within a same or different public network, the method comprising:

receiving from the first processing node a request to communicate with the second processing node, the request being sent from the first processing node, through a first network address translation (NAT) enabled router, through the private network, to a second NAT enabled router, wherein the request includes a private address associated with the first processing node and is received into the second NAT enabled router;

obtaining a public address to be associated with the first processing node and sending the public address to the first processing node, the obtained public address being based on an address space associated with the requested second processing node;

creating a first binding between the public address and the private address associated with the first processing node; and sending the first binding to the first NAT enabled router.

2. A method as recited in claim 1, wherein the first binding is a NAT entry within a NAT table, the NAT entry having an inside global address equal to the public address associated with the first processing node and an inside local address equal to the private address associated with the first processing node.

3. A method as recited in claim 1, further comprising:
receiving communication data sent from the first processing node to the second processing node, the communication data having a source address equal to the private address associated with the first processing node and being received into the second NAT enabled router;
translating the source address of the communication data from the private address into the public address associated with the first processing node, the translation being based on the first binding; and
forwarding the translated communication data to the second processing node.

4. A method as recited in claim 1, wherein the public address associated with the first processing node is obtained by querying the second processing node.

5. A method as recited in claim 1, wherein the private network is a wireless network.

6. A method as recited in claim 5, wherein the second processing node is an internet service provider (ISP) server and the first processing node is a customer device for accessing the wireless network, through which the ISP server may be accessed.

7. A method as recited in claim 6, wherein the wireless network allows access to a plurality of different ISP servers.

8. A method as recited in claim 1, wherein a second binding is created between the public address and the private address associated with the first processing node and is formed at the second NAT enabled router.

9. A method as recited in claim 8, wherein the first binding and the second binding each include a no_payload flag that specifies that translations performed with such bindings are not to be performed on a data's payload.

10. A method as recited in claim 1, wherein the first binding includes a no_payload flag that specifies that translations performed with such bindings are not to be performed on a data's payload.

11. A first network address translation (NAT) system operable to handle data sent from a first processing node within a public network, through a private network, to a second node within a same or different public network, the first NAT system comprising:
one or more processors;
one or more memory, wherein at least one of the processors and memory are adapted to:
receive from the first processing node a request to communicate with the second processing node, the request being sent from the first processing node, through a second network address translation (NAT) system, through the private network, to the first NAT system, wherein the request includes a private address associated with the first processing node;
obtaining a public address to be associated with the first processing node and sending the public address to the first processing node, the obtained public address being based on an address space associated with the requested second processing node;
creating a first binding between the public address and the private address associated with the first processing node; and
sending the first binding to the second NAT system.

12. A first NAT system as recited in claim 11, wherein the first binding is a NAT entry within a NAT table, the NAT entry having an inside global address equal to the public address associated with the first processing node and an inside local address equal to the private address associated with the first processing node.

13. A first NAT system as recited in claim 11, wherein at least one of the processors and memory are further adapted to:
receive communication data sent from the first processing node to the second processing node, the communication data having a source address equal to the private address associated with the first processing node;
translate the source address of the communication data from the private address into the public address associated with the first processing node, the translation being based on the first binding; and
forward the translated communication data to the second processing node.

14. A first NAT system as recited in claim 11, wherein the public address associated with the first processing node is obtained by querying the second processing node.

15. A first NAT system as recited in claim 11, wherein the private network is a wireless network.

16. A first NAT system as recited in claim 15, wherein the second processing node is an internet service provider (ISP) server and the first processing node is a customer device for accessing the wireless network, through which the ISP server may be accessed.

17. A first NAT system as recited in claim 16, wherein the wireless network allows access to a plurality of different ISP servers.

18. A first NAT system as recited in claim 11, wherein the first binding includes a no_payload flag that specifies that translations performed with such bindings are not to be performed on a data's payload.

19. A first NAT system as recited in claim 11, wherein the public address associated with the first processing node is obtained by assigning a public address from a pool of public addresses associated with the second processing node.

20. An apparatus for handling data sent from a first processing node within a public network, through a private network, to a second node within a same or different public network, the apparatus comprising:
means for receiving from the first processing node a request to communicate with the second processing node, the request being sent from the first processing node, through a first network address translation (NAT) enabled router, through the private network, to a second NAT enabled router, wherein the request includes a private address associated with the first processing node and is received into the second NAT enabled router;
means for obtaining a public address to be associated with the first processing node and sending the public address to the first processing node, the obtained public address being based on an address space associated with the requested second processing node;
means for creating a first binding between the public address and the private address associated with the first processing node; and
means for sending the first binding to the first NAT enabled router.

* * * * *